United States Patent

[11] 3,588,653

| [72] | Inventor | Don J. Corrigall<br>Appleton, Wis. |
|---|---|---|
| [21] | Appl. No | 715,036 |
| [22] | Filed | Mar. 21, 1968 |
| [45] | Patented | June 28, 1971 |
| [73] | Assignee | Miller Electric Manufacturing Company<br>Appleton, Wis. |

[54] MOTOR SPEED CONTROL CIRCUIT HAVING FEEDBACK RESPONSIVE TO LOAD POWER DEMAND
7 Claims, 3 Drawing Figs.

| [52] | U.S. Cl. | 318/331 |
|---|---|---|
| [51] | Int. Cl. | H02p 5/16 |
| [50] | Field of Search | 318/331, 345, 332; 321/45 (C); 307/252 |

[56] References Cited
UNITED STATES PATENTS

| 3,177,418 | 4/1965 | Meng | 318/331 |
|---|---|---|---|
| 3,237,073 | 2/1966 | Bartley et al. | 318/345 |

*Primary Examiner*—Oris L. Rader
*Assistant Examiner*—Thomas Langer
*Attorney*—Sughrue, Rothwell, Mion, Zinn and MacPeak ABSTRACT: A motor speed control circuit in which the armature winding is in parallel with a potentiometer and a storage capacitor, and the parallel circuit is in series with an SCR. A second capacitor is charged from the potentiometer tap and controls the firing time of a unijunction transistor, which in turn gates on the SCR. The storage capacitor, which has a large value and a short charging time, supplies most of the armature current and serves as a feedback source for the potentiometer.

INVENTOR
DON JOSEPH CORRIGALL

INVENTOR
DON JOSEPH CORRIGALL
BY Sughrue, Rothwell, Mion, Zinn & Macpeak
ATTORNEYS

MOTOR SPEED CONTROL CIRCUIT HAVING FEEDBACK RESPONSIVE TO LOAD POWER DEMAND

BACKGROUND OF THE INVENTION

This invention relates to a circuit for regulating the average power level in an inductive or resistive load, and is particularly useful for regulating speed of a shunt, compound or permanent magnet-type DC motor. The most commonly employed method of speed control for DC motors is armature power regulation, and the majority of such controls use some type of feedback arrangement to provide better speed regulation under varying conditions of motor load and line voltage.

The feedback signal is generally derived from either a tachometer generator or from the counter EMF of the motor itself. A tachometer generator feeds back a continuous signal that is directly proportional to the motor speed and provides very good regulation, but accurate tachometer generators are quite expensive, are subject to mechanical wear, and driving them drains considerable load power. Counter EMF systems are characterized by small size, simplicity and low power consumption, but have more limited speed ranges and are not sufficiently accurate for many uses, particularly at low speeds. Furthermore, they involve a highly pulsating rather than a continuous armature signal, which results in a comparatively rough or jerky operation.

SUMMARY

A motor speed control circuit according to this invention provides many of the advantages of both feedback systems mentioned above, while eliminating most of their individual disadvantages. In a preferred embodiment, a relatively large storage capacitor is connected across the armature of a DC motor in the manner of a power filter, and the motor is supplied from a rectified AC source. An SCR is connected in series with this parallel combination. When the SCR is gated on, the capacitor charges rapidly to the line voltage level, at which time the SCR turns off. The capacitor then supplies the armature power for the remainder of the half cycle, thus assuring a continuous flow of current through the load. A potentiometer is also connected across the motor armature and its tap is coupled to a charging capacitor that triggers or avalanches a unijunction transistor when the capacitor charge reaches a threshold level. The unijunction transistor gates on the SCR. The firing angle of the SCR is thus controlled by the charging time of the charging capacitor, and this in turn is a function of the potentiometer setting and the voltage across the potentiometer. Since the potentiometer is in parallel with the motor armature and the storage capacitor, it senses the armature voltage or storage capacitor charge as a function of the motor load. In this manner, the potentiometer voltage, and therefore the voltage level on the charging capacitor, is a function of the power demand of the load, thus implementing a feedback mode of control.

When the motor load increases, the storage capacitor discharges more rapidly to answer the increased current demand. This enables the charging capacitor to reach its threshold level more rapidly, and thus, the SCR is fired earlier in each half cycle to supply the increased power necessary to maintain the desired motor speed.

Automatic compensation for supply voltage variations is also effected in that as the supply voltage drops, the storage capacitor is charged to a lower level. This reduces the load voltage, and thus, the potentiometer voltage, and enables the charging capacitor to reach the threshold point earlier in each half cycle, thus advancing the SCR firing time and maintaining the average power at approximately the same level.

Over a speed range of 10:1, the control circuit of this invention provides regulation approaching 1 percent despite ± 10 percent line voltage variation from no load to full load. No tachometer generator is required and thus, no mechanical coupling to the motor is necessary and no power is drained in driving the generator. The control circuit is sensitive to load demand rather than counter EMF per se, and performs equally well with resistive or inductive loads. Furthermore, unlike counter EMF systems, the load power is continuous rather than highly pulsating to result in smoother overall operation. In addition, the control circuit is not frequency sensitive and produces only slight speed variations when the supply frequency changes from the United States standard of 60 Hertz to the European standard of 50 Hertz.

BRIEF DESCRIPTION OF THE DRAWINGS

These and further features of this invention will become apparent to those skilled in the art from the following more detailed description taken in conjunction with the drawings, in which.

DESCRIPTION OF THE PREFERRED EMBODIMENT

Figure 1:
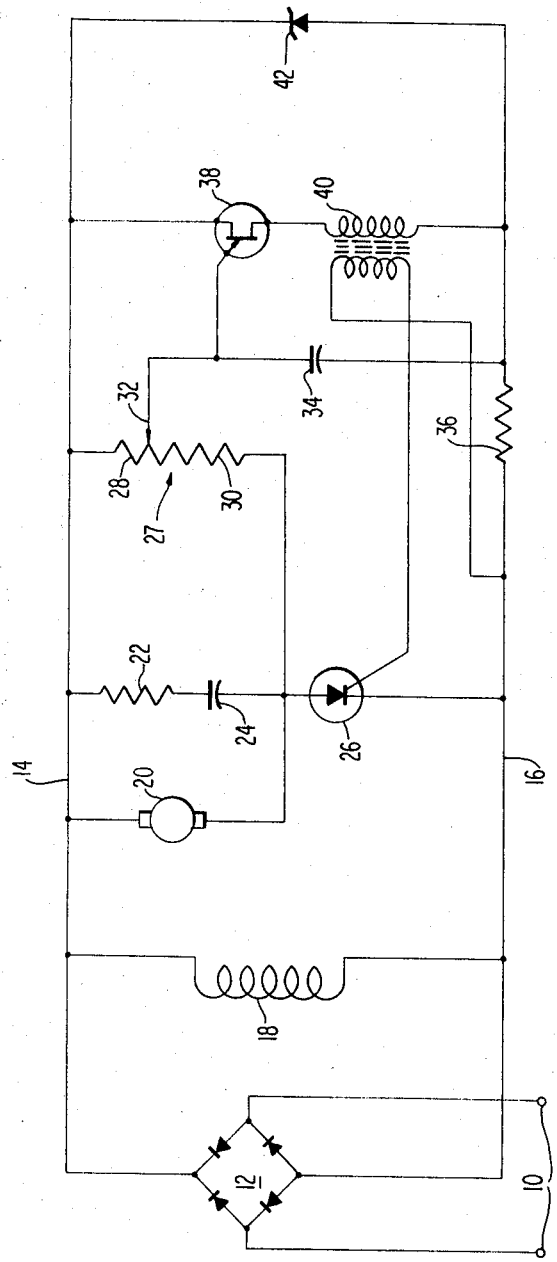
FIG. 1 shows a schematic circuit diagram of a motor speed control circuit constructed in accordance with the teachings of this invention.

Referring to the drawings, the control circuit is powered from a 115 volt 60 cycle AC source applied at input terminals 10 and full wave rectified by diode bridge 12. The bridge output is coupled to lines 14 and 16 between which the operative components of the circuit are connected. Proceeding from left to right in FIG. 1, these components may be listed as follows:

18—Field winding of a shunt wound DC motor.
20—Armature winding of a shunt wound DC motor.
22—Power filter resistor.
24—Power filter capacitor.
26—SCR.
27—Potentiometer.
28—Upper resistance of the potentiometer.
30—Lower resistance of the potentiometer.
32—Potentiometer tap.
34—Charging capacitor.
36—Resistor.
38—Unijunction transistor.
40—Pulse transformer.
42—Zener diode.

An analysis of FIG. 1 reveals two distinct circuits with a common component, namely the upper resistance 28 of the potentiometer 27. One circuit includes the parallel combination of the motor armature 20, resistor 22 in series with capacitor 24, and resistances 28 and 30 of potentiometer 27. Since the three branches are all connected in parallel, the voltage across across the potentiometer 27 is equal to the voltage across the armature 20 at any given instant. This may be expressed as:

$$e_{A20} = e_{R28} + e_{R30} \quad (1)$$

The second circuit comprises the upper resistance 28 of the potentiometer, capacitor 34 and Zener diode 42. In this circuit, the regulated line voltage across the Zener diode determines the voltage across the series combination of resistance 28 and capacitor 34, which may be written as:

$$e_{D42} = e_{R28} + e_{C34} \quad (2)$$

Since the voltage across resistance 28 is common to both equations, they may be combined as follows:

$$e_{A20} = e_{R30} + e_{D42} - e_{C34} \quad (3)$$

This establishes that the load voltage bears a negative relationship to the instantaneous voltage across capacitor 34. Reference will be made to these equations in the operational analysis which follows.

Figure 2:
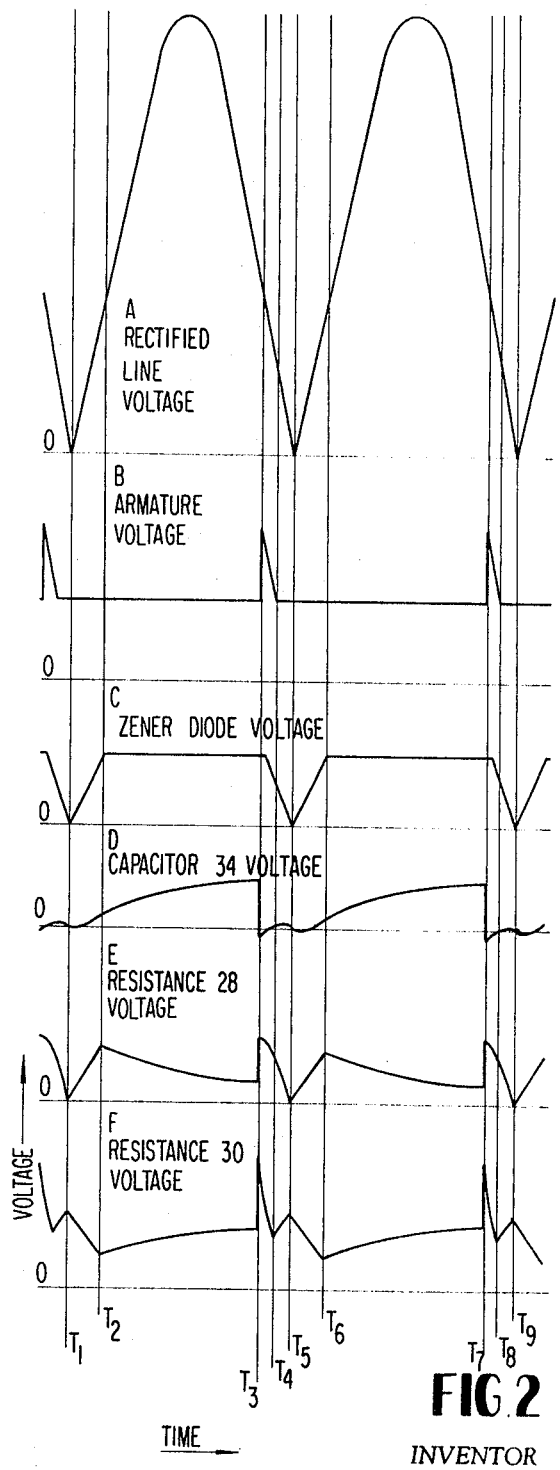
FIGS. 2a—2f show voltage-time plots at various points in the circuit of FIG. 1 under no load conditions.

The operation of the control circuit will be described with reference to the waveform diagrams of FIGS. 2 and 3. Considering first the case shown in FIG. 2 where there is no load on the motor shaft, at the beginning of a half cycle, corresponding to time T1, the SCR 26 is turned off. The line and Zener diode voltages are zero, as shown in FIGS. 2A and 2C, and the armature voltage, as seen in FIG. 2B, is relatively high because capacitor 24 was just charged at the end of the preceding half cycle. The voltage across capacitor 34, FIG. 2D, is zero because the capacitor was just discharged through unijunction transistor 38 and pulse transformer 40 near the end of the last half cycle, and has not yet had time to recharge owing to the dropping line voltage. Since the voltages across the Zener diode 42 and the capacitor 34 are both zero, the voltage across resistance 28 of the potentiometer 27 is also zero, as may be seen from FIG. 2E and equation (2) above. With the drop across upper resistance 28 at zero, the voltage across the lower resistance 30 is quite high due to the relatively high armature voltage, as shown by FIG. 2F and equation (1) above.

As the cycle progresses, the line voltage rises until the Zener diode 42 begins conducting, and thus regulating, at time $T_2$. The armature voltage decreases gradually due to the discharge of capacitor 24 in response to the light no-load power demand. The voltage across capacitor 34 takes a slight negative dip at first since the line voltage just after time $T_1$ is lower than the armature voltage and the SCR is reversed biased. The voltage across the upper resistance 28 of potentiometer 27 rises sharply from time $T_1$ to $T_2$ reflecting the beginning of the charging cycle for capacitor 34. During the same interval, the drop across the lower resistance 30 decreases sharply as prescribed by equation (1).

From time $T_2$ to $T_3$, the armature voltage continues to decrease slowly while the Zener diode regulates at a constant level. The voltage across capacitor 34 rises at a decreasing rate as the capacitor charges through resistance 28. The drop across the latter decreases as the capacitor charges up, while the drop across resistance 30 rises to balance equation (1). Stated another way, as capacitor 34 charges, more of the current through resistance 28 is directed through resistance 30, thus increasing the voltage drop across it.

The truth of equation (1) may be verified by noting that the addition of FIGS. 2E and 2F equals FIG. 2B. In a similar manner, equation (2) is borne out since the addition of FIGS. 2D and 2E yields the Zener voltage curve of FIG. 2C.

At time $T_3$, the charge on capacitor 34 has reached the intrinsic standoff ratio of the unijunction transistor 38, and the latter breaks down or abruptly conducts to discharge capacitor 34 through the pulse transformer 40. This in turn gates on the SCR 26. These actions may be seen in FIG. 2 by the sharp rise in the armature voltage to the line level, the immediate drop in the voltage across capacitor 34, and the rises in the voltages of resistances 28 and 30. With the SCR 26 conducting, capacitor 24 is rapidly charged to a higher level through resistor 22.

As the line voltage continues to decrease, a point is soon reached at time $T_4$ where the charge voltage on capacitor 24 equals the line voltage, at which time the SCR becomes nonconductive. As the line voltage decreases further beyond $T_4$, the SCR becomes reverse biased, thus assuring turnoff even with highly inductive loads. Capacitor 34 receives a negligible charge from $T_4$ to $T_5$ owing to the decreasing line voltage, while the slopes of the voltages across resistances 28 and 30 during this period are substantially opposite in conformance with equation (1) in view of the almost constant armature voltage. At time $T_5$ another cycle of operation begins.

Figure 3:
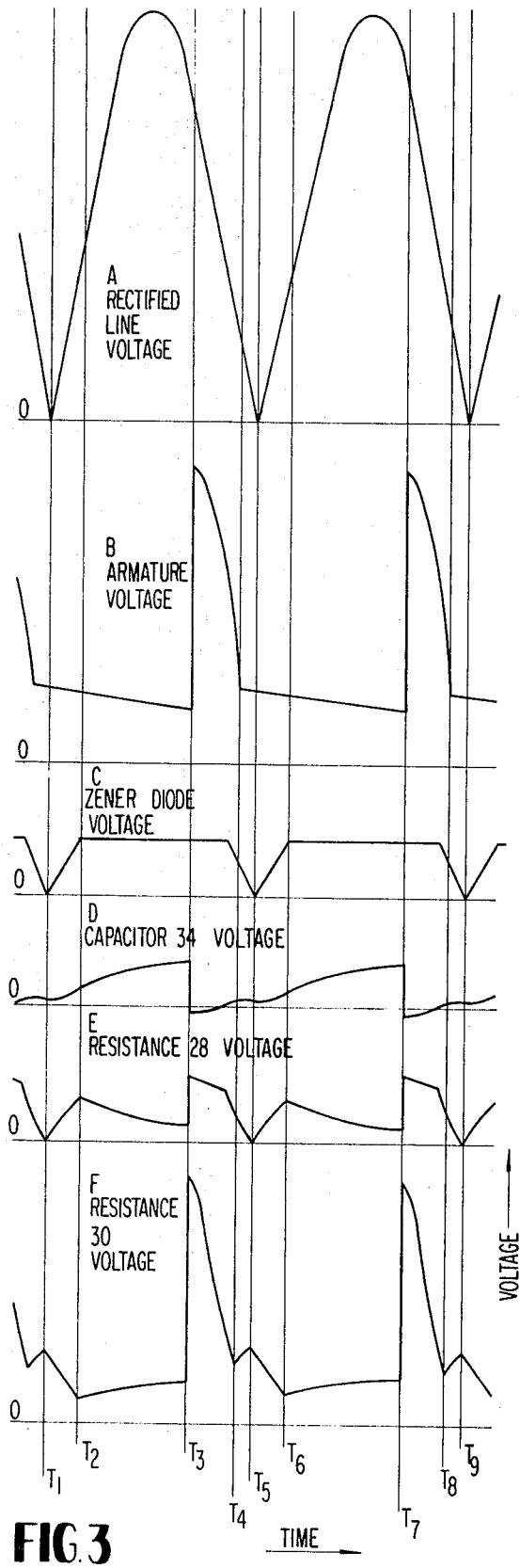
FIGS. 3a—3f show voltage-time plots at the same points under full load conditions.

FIG. 3 illustrates the changes in the voltage waveforms shown in FIG. 2 when the motor armature 20 is subjected to a heavy load. The line and Zener diode curves of FIGS. 3A and 3C remain the same, of course, The curve of FIG. 3B, however, shows how the armature voltage decreases more rapidly than before as capacitor 24 is discharged at a faster rate in response to the increased power demand. To meet such a demand, which is necessary to maintain the same motor speed, as desired, the SCR is fired earlier in the cycle, as also shown in FIG. 3B. To fire the SCR earlier, capacitor 34 must be charged more rapidly to the threshold or avalanche level of unijunction transistor 38. This faster charging action is shown by FIG. 3D and may be explained from equations (1) and (2). As the armature discharges capacitor 24 more rapidly due to the high motor load, the armature voltage decreases faster. The armature voltage is the same as the voltage across potentiometer 27, however, from equation (1), and therefore the drop across the upper resistance 28 of the potentiometer also decreases faster. Since the voltage across the resistance 28 also appears in equation (2), and further, since the Zener diode voltage is constant, then if the voltage across resistance 28 drops more rapidly, the voltage across capacitor 34 must rise more rapidly to balance equation (2). Thus, as the load voltage decreases, the voltage across capacitor 34 increases in an inverse relationship, as seen from equation (3). This is implemented by resistance 28 of the potentiometer serving a dual function by both reflecting the armature voltage and also lying in the charging path for capacitor 34.

There is established, then, a relationship whereby the slope of the load voltage will directly affect the turn-on time of the SCR 26. An earlier turn-on of the SCR means that more power will be furnished to the load and more power will be stored in capacitor 24. A later turn-on will have the opposite effect. By proper selection of the component values of the circuit with respect to the load, this adjustment of power may be utilized to provide a desired degree of load stabilization. When the load is the armature of a DC motor, as in the instant case, such stabilization results in highly effective speed regulation.

The initial charging time of capacitor 34 is established by the value of resistance 28, as determined by the setting of the potentiometer tap 32. The larger resistance 28, the greater the proportionate effect of the load voltage from equation (1). This gives the added benefit of increasing the effective feedback at low power levels, which is a major deficiency of the prior art circuits.

This control circuit also implements automatic compensation for line voltage variations. If the line voltage drops, the amount of voltage available to charge capacitor 24 is less and therefore the capacitor will be charged to a lower level. This reduces the load voltage which, in turn, advances the firing of the SCR to a time earlier in the cycle. This action is similar to an increase in load and therefore the average power level in the load will remain relatively constant.

Since the feedback effect of the circuit is not dependent on counter EMF, the circuit regulates power equally well with resistive or inductive loads. The DC motor armature shown in FIG. 1 could, for example, be replaced by a bank of lights whose illumination would then remain constant in spite of line voltage variations or changes in the lamp resistances due to temperature, burnout, etc.

It was mentioned earlier that resistor 22 has a low value while capacitor 24 is quite high to provide both rapid charging from the line source when the SCR is gated on and sufficient storage capacity to power the load during the major portion of each cycle when the SCR is off. As an example of such values, in a circuit employing a one-eighth horsepower shunt wound DC motor as the load, values of 5 ohms for resistor 22 and 750 microfarads for capacitor 24 were found to provide excellent speed regulation over a wide range.

While the invention has been particularly shown and described with reference to a preferred embodiment thereof, it will be understood by those skilled in the art that various changes in the form and details may be made therein without departing from the spirit and scope of the invention.

I claim:

1. A circuit for regulating the average power level through a load including a silicon controlled rectifier connected in series with the load, a rectifier AC power source connected across the load and SCR, a unijunction transistor connected in series with the primary winding of a pulse transformer across the power source, means connecting the secondary winding of the transformer to the gate terminal of the SCR, and a charging capacitor connected to the emitter terminal of the transistor for avalanching same at a predetermined voltage level, the improvement comprising:
  a. charge storage means connected in parallel with the load, said charge storage means comprising a resistor and a capacitor;
  b. voltage divider means connected in parallel with the load and said charge storage means and having a center tap; and
  c. means connecting the center tap of the voltage divider means to the charging capacitor.

2. A circuit as defined in claim 1 further including voltage regulating means connected across the power source.

3. A circuit as defined in claim 2 wherein the voltage divider means is a potentiometer and the position of the center tap is variable.

4. A circuit as defined in claim 2 wherein the charge storage means comprises the series combination of a resistor and a capacitor.

5. A circuit as defined in claim 3 wherein the charge storage means comprises the series combination of a resistor and a capacitor.

6. The circuit as defined in claim 5 wherein the voltage regulating means is a Zener diode.

7. A circuit as defined in claim 5 wherein the load is the armature winding of a shunt wound DC motor.

UNITED STATES PATENT OFFICE
CERTIFICATE OF CORRECTION

Patent No. 3,588,653        Dated June 28, 1971

Inventor(s) Don J. Corrigall

It is certified that error appears in the above-identified patent and that said Letters Patent are hereby corrected as shown below:

In column 2 of the patent, Line 56 should read:
$$e_{A20} = e_{R28} + e_{R30}$$

In column 2 of the patent, Line 63 should read:
$$e_{D42} = e_{R28} + e_{C34}$$

In column 2 of the patent, Line 68 should read:
$$e_{A20} = e_{R30} + e_{D42} - e_{C34}$$

Signed and sealed this 28th day of December 1971.

(SEAL)
Attest:

EDWARD M. FLETCHER, JR.
Attesting Officer

ROBERT GOTTSCHALK
Acting Commissioner of Patents